United States Patent
Griffin

(10) Patent No.: US 8,849,913 B2
(45) Date of Patent: Sep. 30, 2014

(54) METHOD AND SYSTEM FOR TRIGGERING ACTIVATION OF IMS APPLICATIONS ON A MOBILE RADIO TERMINAL

(75) Inventor: Jeffrey J. Griffin, Raleigh, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1627 days.

(21) Appl. No.: 11/426,023

(22) Filed: Jun. 23, 2006

(65) Prior Publication Data

US 2007/0299913 A1    Dec. 27, 2007

(51) Int. Cl.
*G06F 15/16*    (2006.01)

(52) U.S. Cl.
USPC .......................................... 709/205; 709/230

(58) Field of Classification Search
CPC   H04L 65/1016; H04L 65/1073; H04W 60/00
USPC .................................................. 709/230, 205
See application file for complete search history.

(56) References Cited

U.S. PATENT DOCUMENTS

| | | | |
|---|---|---|---|
| 2003/0181193 A1 | 9/2003 | Wilhelmsson et al. | |
| 2005/0202819 A1* | 9/2005 | Blicker | 455/435.1 |
| 2006/0129628 A1* | 6/2006 | Kamiya et al. | 709/203 |
| 2007/0047523 A1* | 3/2007 | Jiang | 370/352 |
| 2007/0192700 A1* | 8/2007 | Sengar | 715/733 |
| 2007/0243891 A1* | 10/2007 | Civanlar et al. | 455/466 |
| 2008/0195535 A1* | 8/2008 | Liu | 705/39 |

FOREIGN PATENT DOCUMENTS

| | | |
|---|---|---|
| WO | 03058879 | 7/2003 |
| WO | 2005018200 | 2/2005 |
| WO | WO 2005018200 A1 * | 2/2005 |

OTHER PUBLICATIONS

Martin Fowler. UML Distilled: A Brief Guide to the Standard Object Modeling Language, Third Edition. Publisher: Addison Wesley Professional. Pub Date: Sep. 15, 2003.*

International Search Report from corresponding International Application No. PCT/US2006/48599.

* cited by examiner

*Primary Examiner* — Bryan Lee

(74) *Attorney, Agent, or Firm* — Renner, Otto, Boisselle & Sklar, LLP

(57) ABSTRACT

A method of remotely activating a non-native IP multimedia subsystem (IMS) application of an electronic device. The method may include receiving at least one of a general IMS availability registration from the electronic device or a native IMS application registration from the electronic device; identifying the non-native IMS application using a database that associates IMS applications with corresponding electronic devices; transmitting an activation trigger for the non-native IMS application to the electronic device; and receiving an IMS application registration for the non-native IMS application and registering the non-native IMS application.

14 Claims, 2 Drawing Sheets

METHOD AND SYSTEM FOR TRIGGERING ACTIVATION OF IMS APPLICATIONS ON A MOBILE RADIO TERMINAL

TECHNICAL FIELD OF THE INVENTION

The present invention relates generally to electronic equipment, such as electronic equipment for engaging in voice communications and/or for executing internet protocol (IP) multimedia subsystem (IMS) applications. More particularly, the invention relates to a method and system for triggering the activation of IMS applications when the electronic equipment is powered on.

DESCRIPTION OF THE RELATED ART

Mobile and/or wireless electronic devices are becoming increasingly popular. For example, mobile telephones and portable media players are now in wide-spread use. In addition, the features associated with certain types of electronic devices have become increasingly diverse. To name a few examples, many electronic devices have cameras, text messaging capability, Internet browsing functionality, electronic mail capability, video playback capability, audio playback capability, image display capability and hands-free headset interfaces.

Certain services and functionality of electronic devices rely on an application (e.g., a program having executable logic or code) that is executed by the electronic device to implement a service, such as text messaging, push-to-talk (PTT), etc. If the application is not activated and/or is not registered with a network server that supports operation of the application, the corresponding service will not be available to the user. Also, other electronic devices will not be able to interact with the application.

An exemplary platform for providing multimedia services to mobile and fixed location electronic devices is IMS. Exemplary IMS applications include an instant messenger function, a push-to-talk function, a video share function and a presence indicator function. IMS applications are based on third generation partnership project (3GPP) and run over session initiation protocol (SIP). SIP, when coordinated by a SIP server, establishes and controls multimedia communication sessions between client devices over the network. IMS applications may make their way onto electronic devices through, for example, a SIP application programming interface (API) for Java 2 Platform, Micro Edition (J2ME). For instance, Java specification request (JSR) 180 and JSR 281 may be used to construct J2ME mobile information device profile (MIDP) 2.0 applications.

As will be appreciated, the IMS session-based applications described above can create an environment where many compelling services may be offered to end users in the system. Those end users may be persons interacting with an electronic device, such as a mobile telephone, or machines operated by, for example, data service providers and commercial institutions. Most end user services are peer-to-peer services with a SIP server negotiating the relevant connections. A peer-to-peer application of this type on one device typically requires knowledge about the availability and operating state of a compatible application on a target device for operation of the underlying service.

Unfortunately, a way to automatically start-up J2ME MIDP 2.0 applications at system boot-up does not exist. If the application does not start-up and communicate with the supporting SIP server (e.g., register with the server), the supporting SIP server will not be aware that the electronic device having the functionality of the application is present on the network. As a result, end users that wish to interact with a target electronic device using a service associated with an unregistered application on the target electronic device will not have a way of knowing the true availability of the application on the target electronic device.

SUMMARY

In view of the above-mentioned shortcomings associated with conventional IMS applications, there is a need in the art to facilitate start-up and registration of IMS applications following boot-up of an associated electronic device.

According to one aspect of the invention, a method of remotely activating a non-native IP multimedia subsystem (IMS) application of an electronic device includes receiving at least one of a general IMS availability registration from the electronic device or a native IMS application registration from the electronic device; identifying the non-native IMS application using a database that associates IMS applications with corresponding electronic devices; transmitting an activation trigger for the non-native IMS application to the electronic device; and receiving an IMS application registration for the non-native IMS application and registering the non-native IMS application.

According to one embodiment of the method, the method is carried out by a server of a communications network and the electronic device is a mobile radio terminal.

According to one embodiment, the method further includes maintaining the database by associating the non-native IMS application with the electronic device when enrollment is made for a service supported by the non-native IMS application.

According to one embodiment of the method, the activation trigger is a wireless application protocol (WAP) push.

According to one embodiment, the method further includes negotiating session initiation protocol (SIP) connections between the non-native IMS application executed by the electronic device and a corresponding IMS application executed by a SIP client.

According to one embodiment of the method, the non-native IMS application is Java based.

According to one embodiment of the method, an application programming interface (API) for the non-native IMS application is one of Java specification request (JSR) 180 or JSR 281.

According to one embodiment of the method, plural non-native IMS applications associated with the electronic device are identified and activation triggers are transmitted for each non-native IMS application, the activation triggers transmitted without waiting for registration of the non-native IMS application associated with any one of the activation triggers.

According to one embodiment of the method, plural non-native IMS applications associated with the electronic device are identified and activation triggers are transmitted for each non-native IMS application, and except for a first one of the activation triggers, transmission of each activation trigger is dependent on receiving a registration for the IMS application associated with the previously transmitted activation trigger.

According to another aspect of the invention, a program for remotely activating a non-native IP multimedia subsystem (IMS) application of an electronic device is stored on a computer readable medium, and the program includes logic to receive at least one of a general IMS availability registration from the electronic device or a native IMS application registration from the electronic device; identify the non-native IMS application using a database that associates IMS applications with corresponding electronic devices; transmit an activation trigger for the non-native IMS application to the electronic device; and receive an IMS application registration for the non-native IMS application and registering the non-native IMS application.

According to one embodiment of the program, the program is executed by a server of a communications network and the electronic device is a mobile radio terminal.

According to one embodiment, the program further includes logic to maintain the database by associating the non-native IMS application with the electronic device when enrollment is made for a service supported by the non-native IMS application.

According to one embodiment of the program, the activation trigger is a wireless application protocol (WAP) push.

According to one embodiment, the program further includes logic to negotiate session initiation protocol (SIP) connections between the non-native IMS application executed by the electronic device and a corresponding IMS application executed by a SIP client.

According to one embodiment of the program, the non-native IMS application is Java based.

According to one embodiment of the program, an application programming interface (API) for the non-native IMS application is one of Java specification request (JSR) 180 or JSR 281.

According to one embodiment of the program, upon identification of plural non-native IMS applications associated with the electronic device, the logic to transmit transmits an activation trigger for each non-native IMS application, the activation triggers transmitted without waiting for registration of the non-native IMS application associated with any one of the activation triggers.

According to one embodiment of the program, upon identification of plural non-native IMS applications associated with the electronic device, the logic to transmit transmits an activation trigger for each non-native IMS application, and except for a first one of the activation triggers, transmission of each activation trigger is dependent on receiving a registration for the IMS application associated with the previously transmitted activation trigger.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
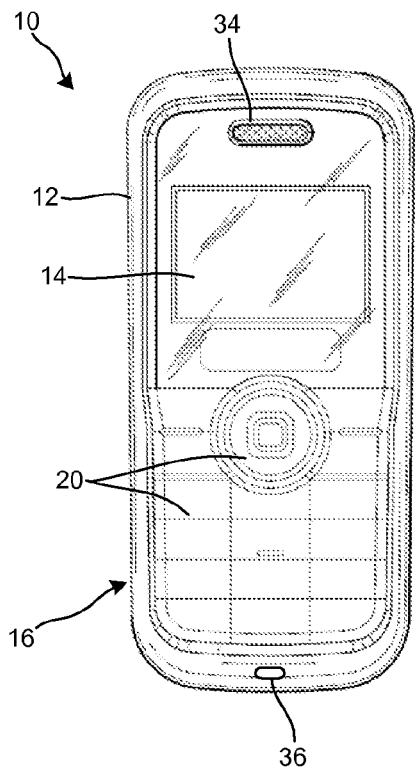
FIG. 1 is a schematic view of a mobile telephone as an exemplary electronic equipment in accordance with an embodiment of the present invention.

The present invention will now be described with reference to the drawings, wherein like reference numerals are used to refer to like elements throughout. It will be understood that the figures are not necessarily to scale.

The term "electronic equipment" includes portable radio communication equipment. The term "portable radio communication equipment," which herein after is referred to as a "mobile radio terminal," includes all equipment such as mobile telephones, pagers, communicators, electronic organizers, personal digital assistants (PDAs), smartphones, portable communication apparatus or the like.

In the present application, the invention is described primarily in the context of a mobile telephone. However, it will be appreciated that the invention is not intended to be limited to a mobile telephone and can be any type of appropriate electronic equipment. Also, embodiments of the invention are described primarily in the context of triggering the activation of one or more IMS applications that are implemented through a Java API, such as JSR 180 or JSR 281. Such applications may be referred to as J2ME MIDP 2.0 applications. However, it will be appreciated that the invention is not intended to be limited to any specific type of application and may be used in conjunction with any application that may be remotely triggered.

Figure 2:
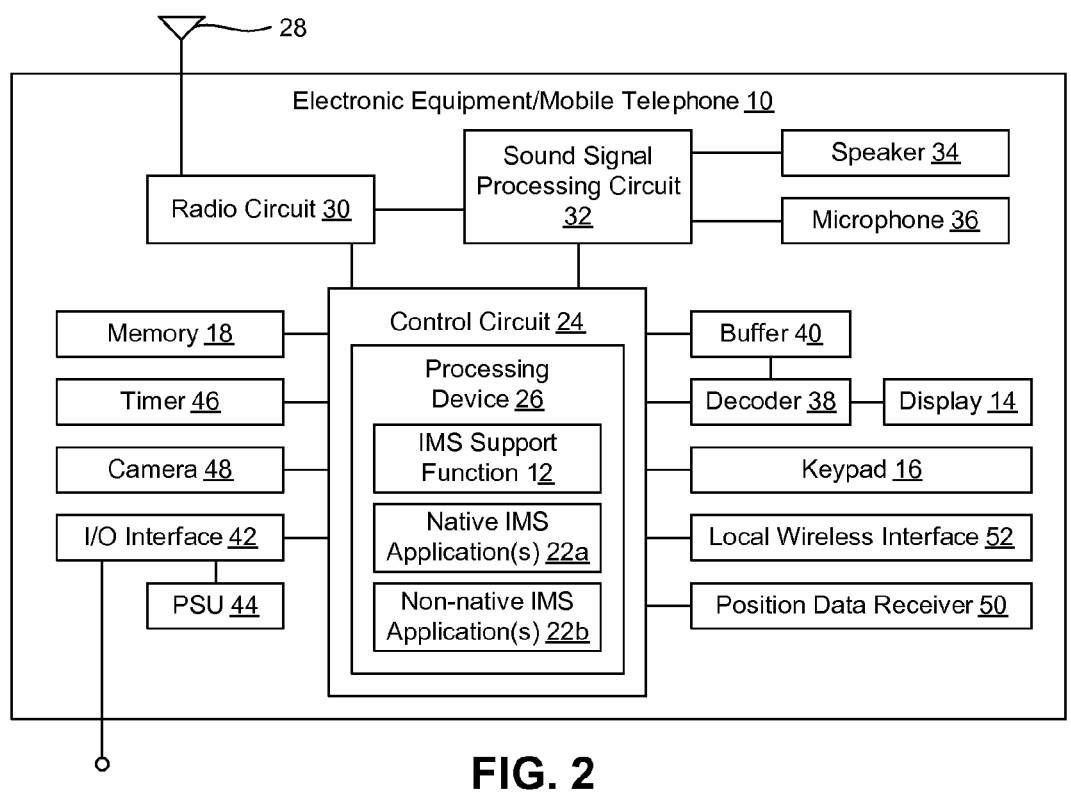
FIG. 2 is a schematic block diagram of the relevant portions of the mobile telephone of FIG. 1 in accordance with an embodiment of the present invention.

Referring initially to FIGS. 1 and 2, an electronic equipment is shown. The electronic equipment 10 includes an IMS application support function 12 that is configured to interact with IMS applications executed by the electronic equipment 10 and interact with a remotely located server. The operation of the IMS support function 12 will be described in greater detail below. It will be appreciated that the IMS support function 12 may be embodied as executable code that may be resident in and executed by the electronic equipment 10. For instance, the IMS support function 12 may be a program stored on a computer or machine readable medium.

The electronic equipment of the illustrated embodiment is a mobile telephone and will be referred to as the mobile telephone 10. The mobile telephone 10 is shown as having a "brick" or "block" form factor housing, but it will be appreciated that other type housings, such as a clamshell housing or a slide-type housing, may be utilized.

The mobile telephone 10 includes a display 14 and keypad 16. The display 14 displays information to a user such as operating state, time, telephone numbers, contact information, various navigational menus, etc., which enable the user to utilize the various features of the mobile telephone 10. The display 14 may also be used to visually display content received by the mobile telephone 10 and/or retrieved from a memory 18 of the mobile telephone 10.

Similarly, the keypad 16 may be conventional in that it provides for a variety of user input operations. For example, the keypad 16 typically includes alphanumeric keys 20 for allowing entry of alphanumeric information such as telephone numbers, phone lists, contact information, notes, etc. In addition, the keypad 16 typically includes special function keys such as a "call send" key for initiating or answering a call, and a "call end" key for ending or "hanging up" a call. Special function keys may also include menu navigation keys, for example, for navigating through a menu displayed on the display 14 to select different telephone functions, profiles, settings, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. The call circuitry also may be responsible for transmitting and receiving data, signals and/or messages in conjunction with the operation of the IMS support function 12.

FIG. 2 represents a functional block diagram of the mobile telephone 10. For the sake of brevity, generally conventional features of the mobile telephone 10 will not be described in great detail herein. The mobile telephone 10 includes a primary control circuit 24 that is configured to carry out overall control of the functions and operations of the mobile telephone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out operation of the mobile telephone 10. The memory 18 may be, for example, one or more of a buffer, a flash memory, a hard drive, a removable media, a volatile memory, a non-volatile memory or other suitable device.

In addition, the processing device 26 executes code in order to perform the IMS support function 12. Additionally, the processing device 26 may execute various IMS applications 22. Example services supported by IMS applications 22 include caller ID (e.g., CLIP, CLIR, etc.), call waiting, call holding, push-to-talk (PTT), call forwarding, call transfer, call blocking, malicious caller identification, lawful interception, announcement services, conference calling, voicemail, text-to-speech, speech recognition (e.g., speech-to-text), location based services, text messaging, multimedia messaging, instant messaging, presence information or presence indicating, multimedia data transcoding, video share services, and so on.

Some IMS applications 22 may be "native" IMS application 22a, which are typically installed on the mobile telephone 10 at the time of manufacture. Additionally, a base IMS stack (e.g., which forms a part of the IMS support function 12 or is separately executable from the IMS support function 12) may contain logic to trigger activation of the native IMS applications 22a when the mobile telephone 10 is power-up (e.g., turned on) after a period of time when the mobile telephone 10 has been turned off. Other IMS applications 22b may be non-native IMS applications 22b, which are typically installed on the mobile telephone 10 after manufacture (e.g., by the user or by a communications service provider). When a non-native IMS application 22b is loaded onto the mobile telephone 10 for execution, the base IMS stack is not modified to trigger activation of the non-native IMS applications 22b. Thus, for non-native IMS applications 22b that are implemented through an API such as JSR 180 or JSR 281, these application will not become activated at mobile telephone 10 power-up without some additional action. Described in greater detail below is a technique for non-native IMS application 22b start-up with the cooperation of a remote server.

It will be apparent to a person having ordinary skill in the art of computer programming, and specifically in applications programming for mobile telephones or other electronic devices, how to program a mobile telephone 10 and remote server (described below with respect to FIG. 3) to operate and carry out the functions described herein. Accordingly, details as to the specific programming code have been left out for the sake of brevity. Also, while the IMS support function 12 is executed by the processing device 26 in accordance with a preferred embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, MBMS, WiFi, WiMax, DVB-H, ISDB-T, etc as well as advanced versions of these standards.

The mobile telephone 10 further includes a sound signal processing circuit 32 for processing audio signals transmitted by/received from the radio circuit 30. Coupled to the sound processing circuit 32 are a speaker 34 and a microphone 36 that enable a user to listen and speak via the mobile telephone 10 as is conventional. The radio circuit 30 and sound processing circuit 32 are each coupled to the control circuit 24 so as to carry out overall operation. Audio data may be passed from the control circuit 24 to the sound signal processing circuit 32 for playback to the user. The audio data may include, for example, audio data from an audio file stored by the memory 18 and retrieved by the control circuit 24. The sound processing circuit 32 may include any appropriate buffers, decoders, amplifiers and so forth.

The mobile telephone 10 also includes the aforementioned display 14 and keypad 16 coupled to the control circuit 24. The display 14 may be coupled to the control circuit 24 by a video decoder 38 that converts video data to a video signal used to drive the display 14. The video data may be generated by the control circuit 24, retrieved from a video file that is stored in the memory 18, derived from an incoming video data stream received by the radio circuit 30 or obtained by any other suitable method. Prior to being fed to the decoder 38, the video data may be buffered in a buffer 40.

The mobile telephone 10 further includes one or more I/O interface(s) 42. The I/O interface(s) 42 may be in the form of typical mobile telephone I/O interfaces and may include one or more electrical connectors. As is typical, the I/O interface (s) 42 may be used to couple the mobile telephone 10 to a battery charger to charge a battery of a power supply unit (PSU) 44 within the mobile telephone 10. In addition, or in the alternative, the I/O interface(s) 42 may serve to connect the mobile telephone 10 to a wired personal hands-free adaptor (not shown), such as a headset (sometimes referred to as an earset) to audibly output sound signals output by the sound processing circuit 32 to the user. Further, the I/O interface(s) 42 may serve to connect the mobile telephone 10 to a personal computer or other device via a data cable. The mobile telephone 10 may receive operating power via the I/O interface(s) 42 when connected to a vehicle power adapter or an electricity outlet power adapter.

The mobile telephone 10 may also include a timer 46 for carrying out timing functions. Such functions may include timing the durations of calls, generating the content of time and date stamps, etc. The mobile telephone 10 may include a camera 48 for taking digital pictures and/or movies. Image and/or video files corresponding to the pictures and/or movies may be stored in the memory 18. The mobile telephone 10 also may include a position data receiver 50, such as a global positioning system (GPS) receiver, Galileo satellite system receiver or the like. The mobile telephone 10 also may include a local wireless interface 52, such as an infrared transceiver and/or an RF adaptor (e.g., a Bluetooth adapter), for establishing communication with an accessory, a hands-free adaptor (e.g., a headset that may audibly output sounds corresponding to audio data transferred from the mobile telephone 10 to the headset), another mobile radio terminal, a computer or another device.

The mobile telephone 10 may be configured to transmit, receive and process data, such as text messages (e.g., colloquially referred to by some as "an SMS"), electronic mail messages, multimedia messages (e.g., colloquially referred to by some as "an MMS"), image files, video files, audio files, ring tones, streaming audio, streaming video, data feeds (including podcasts) and so forth. Processing such data may include storing the data in the memory 18, executing applications to allow user interaction with data, displaying video and/or image content associated with the data, outputting audio sounds associated with the data and so forth.

Figure 3:
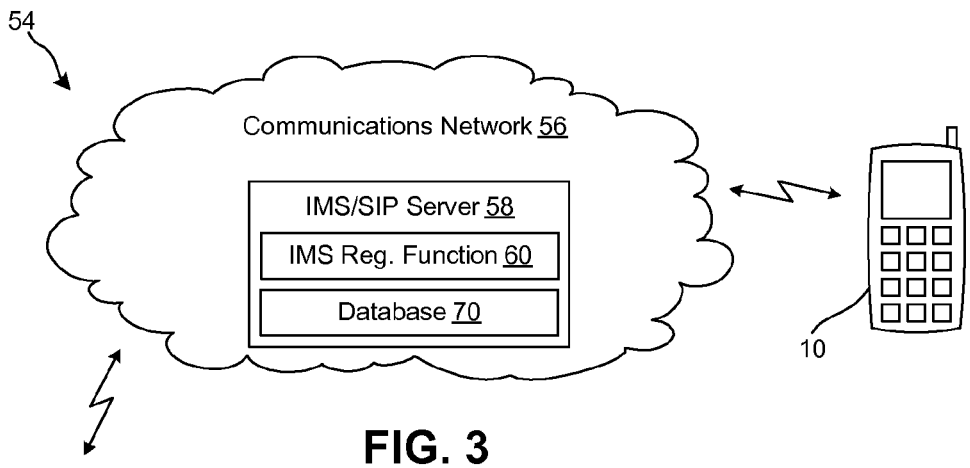
FIG. 3 is a schematic diagram of a communications system in which the mobile telephone of FIG. 1 may operate.

With additional reference to FIG. 3, the mobile telephone 10 may be configured to operate as part of a communications system 54. The system 54 may include a communications network 56 having a server 58 (or servers) for managing calls placed by and destined to the mobile telephone 10, transmitting data to the mobile telephone 10 and carrying out any other support functions. The server 58 communicates with the mobile telephone 10 via a transmission medium. The transmission medium may be any appropriate device or assembly, including, for example, a communications tower, another mobile telephone, a wireless access point, a satellite, etc. Portions of the network may include wireless transmission pathways. The network 56 may support the communications activity of multiple mobile telephones 10 and other types of end user devices.

As will be appreciated, the server 58 may be configured as a typical computer system used to carry out server functions and may include a processor configured to execute software containing logical instructions that embody the functions of the server 58. Those functions may include an IMS registration function 60 that triggers the activation of IMS applications 22 on the mobile telephone 10, as will be described in greater detail below. The IMS registration function 60 may be embodied as executable code that may be resident in and executed by the server 58. For instance, the IMS registration function 60 may be a program stored on a computer or machine readable medium. Also, while the IMS registration function 60 is executed by the server 58 in accordance with the preferred embodiment of the invention, such functionality could also be carried out via dedicated hardware, firmware, software, or combinations thereof, without departing from the scope of the invention. The server 60 also may function as a SIP server to negotiate interaction between the mobile telephone 10 and another IMS/SIP client 62. The client 62 may be a mobile radio terminal or some other type of mobile or fixed location device.

Figure 4:
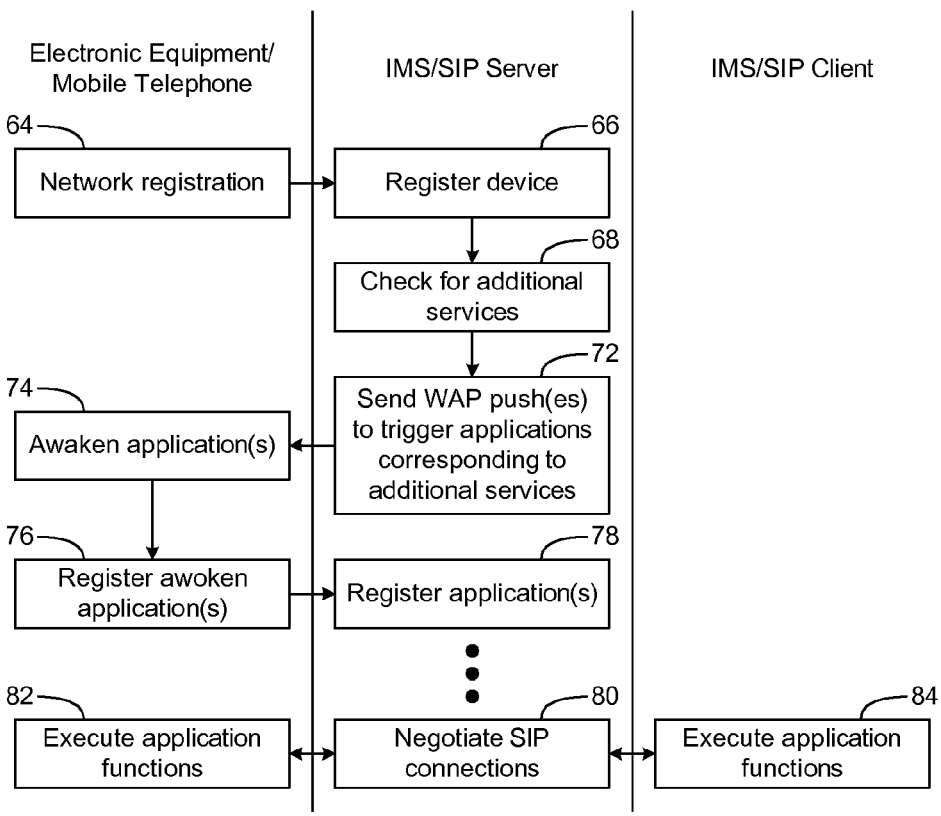
FIG. 4 is an illustration of logical operations performed by the mobile telephone, a server and a client device in accordance with various aspects of the present invention.

With additional reference to FIG. 4, illustrated are logical operations performed by the mobile telephone 10 when executing the IMS support function 12 and the server 58 when executing the IMS registration function 60. FIG. 4 may be thought of as a flow chart of logical blocks that make up the IMS support function 12 and the IMS registration function 60. In addition, FIG. 4 may be thought of as depicting steps of a method carried out by the mobile telephone 10 and a method carried out by the server 58. Although FIG. 4 shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

The logical flow may commence in block 64 where the mobile telephone 10 seeks registration with the communications network 56. For instance, after the mobile telephone 10 has been powered off and powered on again, part of the boot-up process may entail communication with the communication network 56 to negotiate the presence of the mobile telephone 10 in the system 54. Such registration may include execution of an base IMS protocol stack, which may form part of the IMS support function 12. The base IMS protocol stack may contact the server 60 to seek registration for general IMS availability with the server 60. In addition, the base IMS protocol stack may trigger activation of the native IMS applications 22a (or those applications may be self-triggering). Upon activation, the native IMS applications 22a may seek registration with the server so that the functionality of the native IMS applications 22a may be exploited.

In block 66, the server 60 carries out coordinating logic routines to register the mobile telephone 10. In response to the activity of block 64, such registration may include registration for general IMS availability and registration of the native IMS applications 22a.

Proceeding to block 68, the server 60 may check a database 70 (FIG. 3) for a listing of non-native IMS application 22b for which the mobile telephone 10 is associated. The database 70 may be a look-up table or any other suitable database structure. To populate the database 70, the server 60 may update the database 70 when a new IMS application 22b is installed on the mobile telephone 10 (e.g., by pushing a Java client from a personal computer to the mobile telephone 10) and when enrollment is made for the service associated with the IMS application 22b. Using the enrollment information, details of the installed IMS application may become known to the server 58 and used to update the database 70.

Upon identifying the non-native IMS applications 22b associated with the mobile telephone 10 in block 68, the logical flow may proceed to block 72 where the server 60 takes action to trigger activation the non-native IMS applications 22b in the mobile telephone 10. In one embodiment, the server 60 transmits a wireless application protocol (WAP) push to the mobile telephone 10. The WAP push may contain data to trigger one or more of the IMS applications 22b. In a preferred embodiment, a WAP push in accordance with a standardized demand for registration is transmitted for each non-native IMS application 22b to an appropriate port for the IMS application 22b. In other embodiment, a single WAP push may be configured to trigger activation of multiple IMS applications 22b.

In block 74, after receiving the trigger to activate one or more of the non-native IMS applications 22b (e.g., receiving WAP push registry demands transmitted by the server 60), the mobile telephone 10 may awaken the corresponding non-native IMS application(s) 22b. Following activation of the non-native IMS applications 22b in block 74, the activated non-native IMS applications 22b may seek registration with the server 60 in block 76. Corresponding registration steps may be taken by the server 60 in block 78.

As will be appreciated, the forgoing logical process provides a mechanism by which all IMS applications 22 of a mobile telephone 10 may be activated following a rebooting of the mobile telephone 10, regardless of whether the application is an after-market Java based application or a native application pre-loaded on the mobile telephone 10. In a preferred embodiment, the logical process is expeditiously carried out starting with the registration of block 64 in order to activate the services associated with the non-native IMS applications 22 as quickly as possible after rebooting of the mobile telephone. In other embodiments, the transmission of an activating trigger for one or more of the non-native IMS applications 22b may be deferred by the server 60.

In one embodiment, activating triggers may be transmitted for the non-native IMS applications 22b as a burst of transmissions and without waiting for any one non-native IMS application 22b to awaken and register. In other embodiment, such parallel treatment of IMS applications 22 may be substituted with serial treatment of the IMS applications 22. For instance, after transmitting a trigger for one IMS application 22, the server 60 may wait to receive a registration request for the corresponding IMS application 22 before transmitting a trigger for another of the IMS applications 22.

With continued reference to FIG. 4, after the IMS applications 22 become active on the mobile telephone 10 and registered with the server 60, the services associated with the IMS applications 22 may be exploited. For instance, in block 80, the server 60 may negotiate SIP connections between the mobile telephone 10 and the client 62 while the mobile telephone and the client 62 respectively execute appropriate IMS applications 22 in blocks 82 and 84.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of remotely activating a non-native IP multimedia subsystem (IMS) application of an electronic device, comprising:
receiving at least one of a general IMS availability registration from the electronic device or a native IMS application registration from the electronic device;
responding to the general IMS availability registration or the native IMS application registration by checking a database that associates IMS applications with the electronic device from which the registration was received and identifying a non-native IMS application corresponding to the electronic device from which the registration was received for remote activation;
transmitting an activation trigger for the identified non-native IMS application to the electronic device from which the registration was received; and
receiving an IMS application registration for the identified non-native IMS application corresponding to the electronic device from which the registration was received and registering the identified non-native IMS application; and
wherein the activation trigger is a wireless application protocol (WAP) push; and
wherein plural non-native IMS applications associated with the electronic device are identified and activation triggers are transmitted for each identified non-native IMS application, the activation triggers transmitted without waiting for registration of the non-native IMS application associated with any one of the activation triggers.

2. The method of claim 1, wherein the method is carried out by a server of a communications network and the electronic device is a mobile radio terminal.

3. The method of claim 1, further comprising maintaining the database by associating the non-native IMS application with the electronic device when enrollment is made for a service supported by the non-native IMS application.

4. The method of claim 1, further comprising negotiating session initiation protocol (SIP) connections between the non-native IMS application executed by the electronic device and a corresponding IMS application executed by a SIP client.

5. The method of claim 1, wherein the non-native IMS application is Java based.

6. The method of claim 5, wherein an application programming interface (API) for the non-native IMS application is one of Java specification request (JSR) 180 or JSR 281.

7. The method of claim 1, wherein the at least one of a general IMS availability registration from the electronic device or a native IMS application registration from the electronic device is sent from the electronic device when the electronic device is powered on.

8. A non-transitory computer readable medium storing a program, the program for remotely activating a non-native IP multimedia subsystem (IMS) application of an electronic device and comprises executable logic to:
receive at least one of a general IMS availability registration from the electronic device or a native IMS application registration from the electronic device;
respond to the general IMS availability registration or the native IMS application registration by checking a database that associates IMS applications with the electronic device from which the registration was received and identify from the database a non-native IMS application corresponding to the electronic device from which the registration was received for remote activation;
transmit an activation trigger for the identified non-native IMS application to the electronic device from which the registration was received; and
receive an IMS application registration for the identified non-native IMS application corresponding to the electronic device from which the registration was received and registering the identified non-native IMS application; and
wherein the activation trigger is a wireless application protocol (WAP) push; and
wherein upon identification of plural non-native IMS applications associated with the electronic device, the logic to transmit transmits an activation trigger for each identified non-native IMS application, the activation triggers transmitted without waiting for registration of the non-native IMS application associated with any one of the activation triggers.

9. The computer readable medium of claim 8, wherein the program is executed by a server of a communications network and the electronic device is a mobile radio terminal.

10. The computer readable medium of claim 8, further comprising logic to maintain the database by associating the non-native IMS application with the electronic device when enrollment is made for a service supported by the non-native IMS application.

11. The computer readable medium of claim 8, further comprising logic to negotiate session initiation protocol (SIP) connections between the non-native IMS application executed by the electronic device and a corresponding IMS application executed by a SIP client.

12. The computer readable medium of claim 8, wherein the non-native IMS application is Java based.

13. The computer readable medium of claim 12, wherein an application programming interface (API) for the non-native IMS application is one of Java specification request (JSR) 180 or JSR 281.

14. The computer readable medium of claim 8, wherein the at least one of a general IMS availability registration from the electronic device or a native IMS application registration from the electronic device is sent from the electronic device when the electronic device is powered on.

* * * * *